United States Patent Office 3,436,262
Patented Apr. 1, 1969

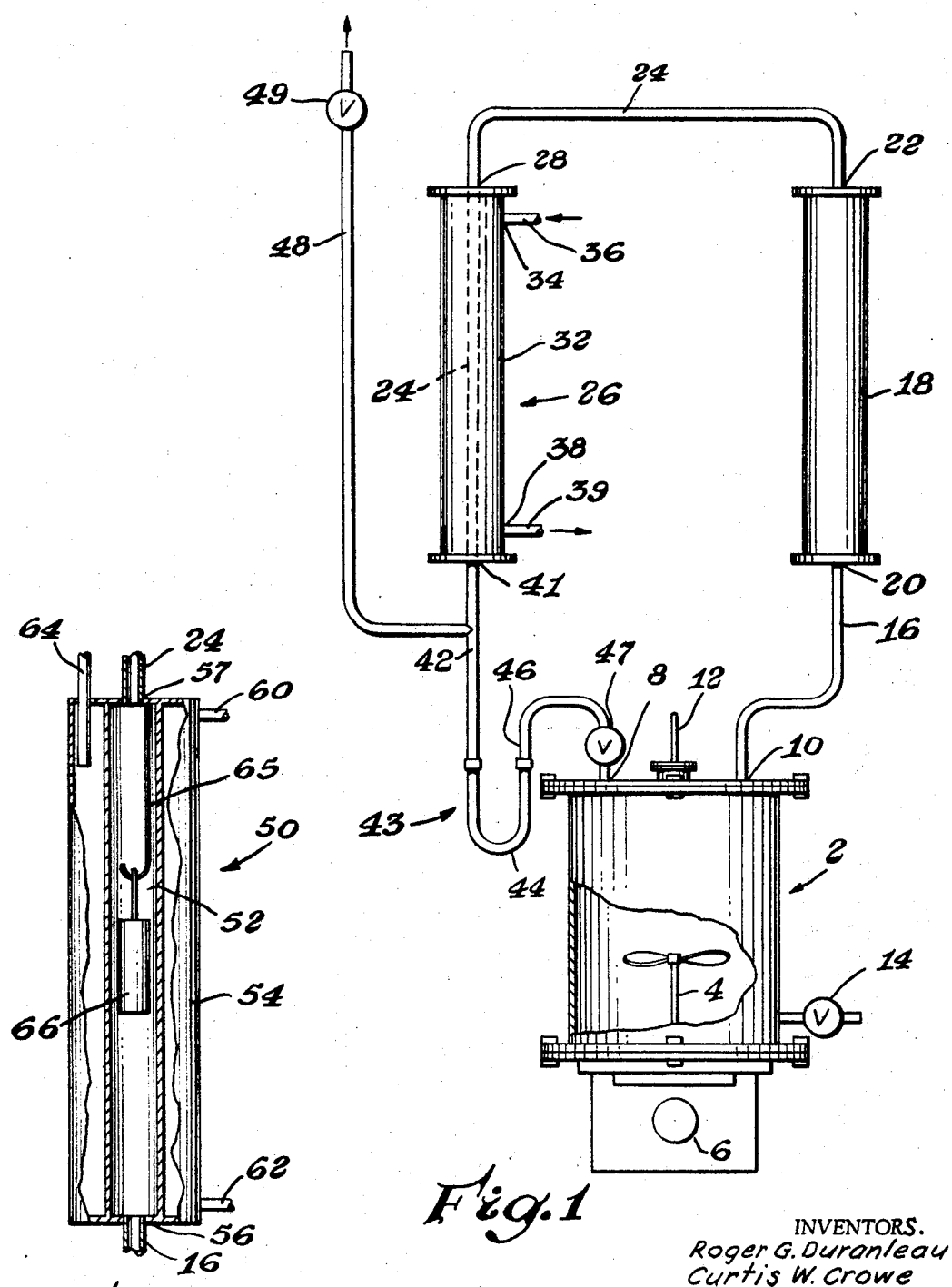

3,436,262
CLEANING BY FOAM CONTACT, AND FOAM REGENERATION METHOD
Curtis W. Crowe, Tulsa, Okla., and Roger G. Duranleau, Blacksburg, Va., assignors to The Dow Chemical Company, Midland, Mich., a corporation of Delaware
Filed Sept. 25, 1964, Ser. No. 399,231
Int. Cl. B08b *3/00, 7/00*
U.S. Cl. 134—10                          8 Claims

ABSTRACT OF THE DISCLOSURE

The cleaning of a solid surface is accomplished by foam contact. A liquid containing a foaming agent and a foam stabilizing agent is heated to generate a foam, the foaming agent being a liquid which converts to a gas at the advanced temperature attained, and the foam stabilizing agent being capable of decreasing the surface tension of the foam so formed. After foam contact with the solid surface, the foam is subjected to a temperature sufficiently low to collapse at least a portion of the foam due to at least a substantial portion of the foaming agent resuming the liquid state at the lower temperature. The collapsed foam is then refoamed by reheating.

---

Figure 3:
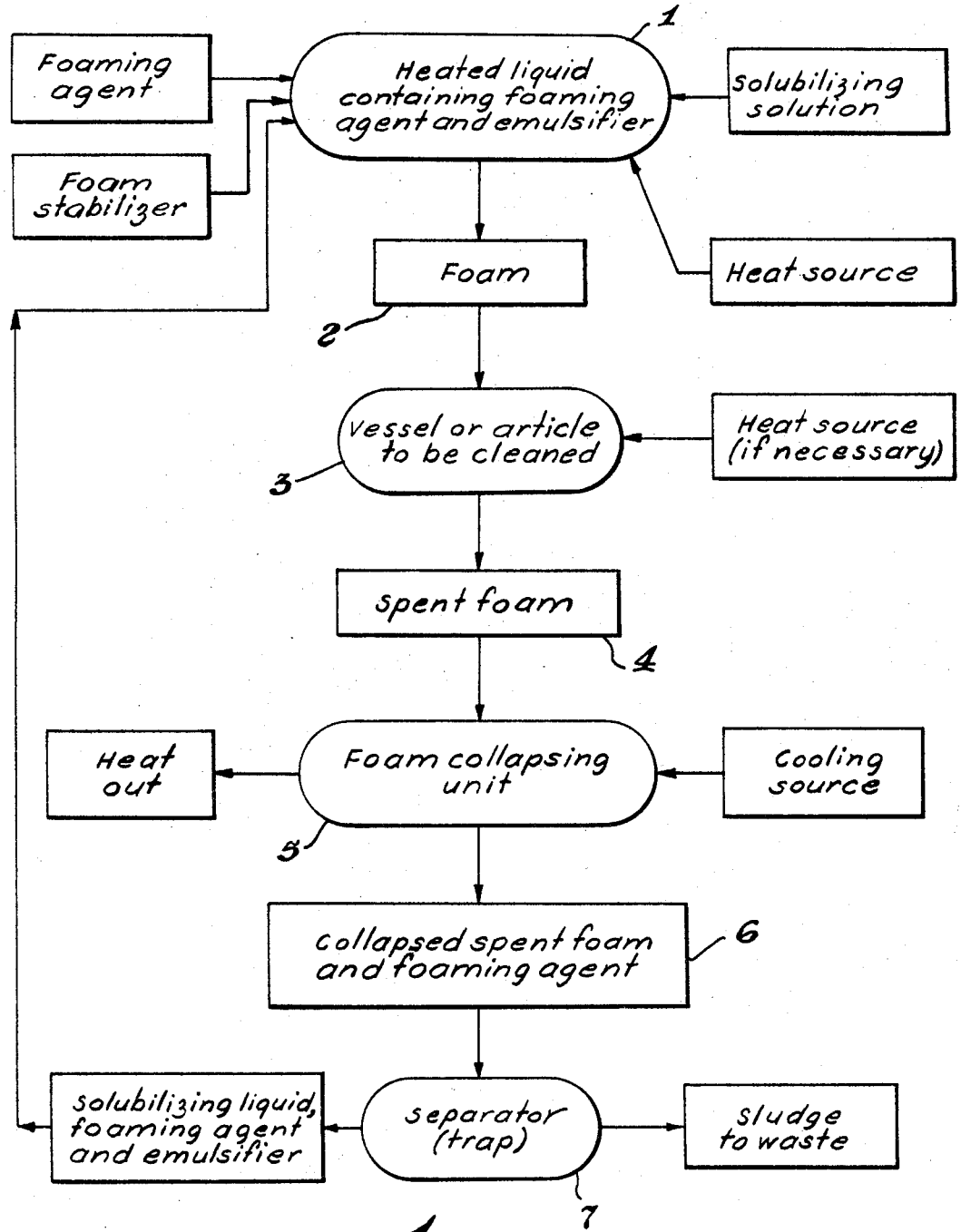

The invention is in the field of foam generation whereby a liquid medium or composition being used, as for cleaning surfaces as described in U.S. Patent 3,037,887. The invention pertains particularly to foam regeneration in a continuous process.

Subsequent to the step in such cleaning operation during which tarnish, scale, or the like is contacted by a solubilizing foam, it is desirable that the foamed composition or medium be broken down or collapsed to a liquid state. It has long been recognized to be highly economical and practical that at least a portion of the thus collapsed liquid be then refoamed for additional or continuous cleaning.

Although as above indicated, foaming of compositions for specific uses for cleaning surfaces, e.g. the interior of vessels or articles is known, a fully satisfactory method and means for collapsing the foam and regenerating it in a continuous process, as desired, has heretofore been unknown. A particular need for such method and means has long existed, but without such need being met in an acceptable practical way.

The principal object of the invention is to provide a method by which a liquid may be foamed, collapsed, and regenerated to provide a continuous process requiring foam action.

The invention, accordingly, is a method for the attainment of this and related objects.

The method of the invention, broadly, encompasses: (1) admixing with a suitable cleaning liquid (which exhibits a solubilizing action on scale, corrosive materials, or accumulated residue on solid surfaces), a liquid or solid foaming agent and a liquid or solid foam stabilizer, (2) heating the resulting mixture to produce a foam, (3) contacting the scale, corrosive materials, or accumulated residue (to be removed) by the thus foamed liquid, (4) cooling the so used foam to collapse at least a substantial portion thereof to a liquid, and (5) reheating the liquid (so formed from the foam) to produce a foam again. The invention may be practiced by foaming a cleaning liquid available on the market or a natural solvent, e.g. water or an oil, contacting the scale or corrosion, collapsing the foam and refoaming. The above steps may be repeated as desired until an adequate cleaning job has been done or the cleaning solution becomes so loaded with solubilized or otherwise dislodged scale and the like as to require special treatment to rejuvenate its cleaning properties or as to require replacement. It is unusual (as a matter of ordinary practice) in carrying out cleaning jobs of average severity, in accordance with the practice of the invention, that the original cleaning solution cannot be satisfactorily foamed, collapsed, and refoamed during the continuous cleaning operation.

The method of the invention more particularly contemplates a continuous foam-cleaning operation which comprises placing a liquid in a suitable vessel, such liquid having a solubilizing action or contains a substance which yields an agent having a solubilizing action on scale deposits or residue, particularly of the nature of that adhering tenaciously to the interior of a vessel or to the exterior and intricate channels or passageways of metal articles suspended or supported in a treating vessel. Such vessel is provided with an inlet and an outlet, a heat-control means, and preferably with a temperature-control and stirring means. A foaming agent and a foam stabilizing agent are admixed with said liquid and the resulting mixture heated to produce foam. At least some of the foam so produced is passed out the outlet of the container and conveyed to and into the vessel to be cleaned, or the treating vessel containing the article to be cleaned, through said vessel, and out the outlet thereof. The so used foam is conveyed to a temperature-conditioning unit provided with inlet and outlet and heat-control means wherein at least a substantial portion of the so used foam is collapsed to a liquid. The resulting liquid is then preferably passed through a trap or filter means whereby suspended solids in the liquid are moved. It is thereafter reheated and foam again generated.

The apparatus employed in the method of the invention requires a heating unit for liquid and a collapsing unit for foam, each unit being provided with suitable heat-control means and appropriately positioned inlets and outlets. The appartus will be better understood by reference to the annexed drawing.

FIGURE 1 of the drawing comprises: chamber 2 provided with stirring means 4, heating means 6, inlet 8, outlet 10, thermometer 12, and drain valve assembly 14; transfer pipe 16 leading from outlet 10; a vessel 18 (containing scale on the interior thereof to be removed), having inlet 20 connected to pipe 16, and outlet 22 connected to transfer pipe 24 leading therefrom; foam collapsing unit 26 provided with inlet 28 to admit pipe 24; shell 32 (for a circulating temperature control liquid), said shell having inlet 34 for admitting the temperature control liquid (supplied by line 36) and outlet 38 to provide return of the temperature control liquid via discharge pipe 39 and outlet 41 communicating with pipe 42; trap assembly 43 into which pipe 42 enters; removable pipe section 44, and return pipe 46 equipped with control valve 47 and connected to inlet 8 of container 2; and vent 48 equipped with valve 49 to provide controlled release of gas as desired.

FIGURE 2 of the drawing is a modification of FIGURE 1 which is applicable for use in foam cleaning the surfaces of objects or articles other than the interior of a vessel. FIGURE 2 shows a cylindrical shaped treating tank 50 (for alternative use instead of vessel 18 of FIGURE 1), which is provided with treating chamber 52, shell 54, opening 56 for admission of inlet pipe 16 and opening 57 for outlet pipe 24, and pipes 60 and 62 for supplying and removing temperature control liquid, respectively, and thermometer 64. Shown, suspended in chamber 52 by means of support 65, is article 66 to be foam cleaned.

FIGURE 3 illustrates a flow sheet of an embodiment of the invention, schematically showing the steps of (1) heating the solubilizing liquid containing foaming agent and stabilizing agent; passing the foam (2) so foamed into vessel (3) to be cleaned or into a treating tank containing an article to be cleaned (heat being supplied if necessary); passing the spent foam (4) into the foam collapsing unit (5) provided with a cooling means; passing the collapsed spent foam, containing spent foam and some foaming agent and stabilizing agent to collector (6) provided therefor and thence into trap or separator (7) where a substantial portion of the sludge, resulting from the dislodged scale, is removed and the solubilizing liquid containing foaming agent and stabilizing agent is returned for heating step (1). The solubilizing solution may be either an organic or aqueous liquid, which dissolves or dislodges, and carries along dissolved or dispersed therein, the dissolved or dislodged scale, corrosion, or surface deposits. Mineral acids, e.g. nitric, hydrochloric, sulfuric, or phosphoric or certain organic acids, e.g. citric, tartaric, oxalic, sulfonic or the like; alkaline materials, e.g. NaOH, $Na_2CO_3$, $NaHCO_3$; phosphates, e.g. of the nature of polyphosphates and Calgon; sequestering and chelating agents, e.g. ethylene-diamine-tetracetic acid and certain salts thereof.

The foaming agent may be any material which is a liquid or solid at the conditions existing in the collapsing unit but which is gaseous at the conditions existing in the foaming unit. A Freon, of which $CClF_2CClF_2$, $CHClF_2$, and mixtures thereof are illustrative, fluorocarbons, and hydrocarbons having an acceptable distillation range are acceptable foaming agents.

The stabilizing agent is a liquid which decreases the surface tension sufficiently at the foaming temperature to provide a stable foam.

The stabilizing agent preferred in the practice of the invention is that described in U.S. Patent 2,759,019. The preferred species thereof to employ in the invention is the quaternary methyl halide of a perfluoro-$(C_8F_{17})$alkanesulfonamide. The species especially preferred is the methiodide which appears to have a structure

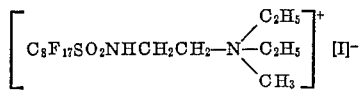

It is resistant to hydrolysis and is relatively stable in sulfuric acid. The pure material is a soft tan powder which melts at somewhat above 130° C. and is stable against decomposition up to about 195° C. It pyrolyzes at between 250° and 270° C.

The method of the invention is carried out, as set out diagrammatically in the flowsheet of FIGURE 3 of the drawing, by admixing a solubilizing agent, a base liquid, e.g. water or a light oil, a foaming agent, and a foam stabilizing agent, in a suitable vessel provided with a heat source, and heating the mixture to a temperature sufficient to produce a foam which expands and passes into the vessel to be cleaned or into the treating tank in which an article to be cleaned has been placed. After contact with either the interior of the vessel to be cleaned or the article in the cleaning tank, the foam is forced on into the collapsing unit where it becomes substantially a liquid. As a liquid, substantially free of foam, it is preferably passed into a trap where the suspended solids settle out. The liquid, free of a major portion of any suspended solids, is then passed back into the heating vessel. The trap may be periodically removed and the sludge which has collected therein cleaned out. Since the density of the foam is markedly less than that of the liquid resulting from the foam when collapsed, the weight of the liquid in the return arm (e.g. pipes 42 and 46 and trap 43 of FIGURE 1) provides sufficient hydraulic pressure to force the liquid back into foaming unit 2. Vent line 48 is filled with liquid to a height substantially level with the level of liquid in unit 26 and thereby acts as a safety relief valve.

The solubilizing material may be an acid, an alkali, an organic solvent, a detergent, a salt solution or water alone. It may be a solution, mixture, emulsion or slurry. Usually a solid or liquid solubilizing agent, e.g. a borate, carbonate, phosphate, $HNO_3$, HCl, $H_2SO_4$, NaOH, or an organic sulfate or sulfonate, of at least about 0.05% by weight to point of saturation, e.g. 2–15%, is usually used. The cleaning composition is heated, and the cleaning done at a temperature of between about 125° F. and about 225° F., dependent upon such conditions as the severity of the cleaning job and the components of the foamed cleaning composition. It is preferred that the temperature employed be between about 150° F. and 200° F., as when the perfluoro-$(C_8F_{17})$alkanesulfonamide is employed as the foam stabilizer. The time during which the foamed cleaning composition is maintained in contact with the scaled or corroded surface being cleaned varies between about 1 hour and as much as about 48 hours. However, in most cleaning jobs, e.g. cleaning nuclear reactors for which the invention is especially well suited, between about 8 and 16 hours are usually taken up.

Illustrative of foaming agents are chloroform, carbon tetrachloride, the Freons (as above described), cyclohexane, and n-pentane.

Illustrative of other foam stabilizing agents than those described in U.S. Patent 2,759,019 are sodium-N-coconut acid-N-methyl-taurate which is of the anionic type surfactant, di-coconut-di-methyl ammonium chloride which is of the cationic type surfactant, ethylene oxide-nonyl-phenol adducts, and 2 - coconut - 1 - hydroxy-1-sodium ethoxy-1-sodium acetoxy imidazoline-2. However, such stabilizing agents are not fully the equivalent of those described in said patent in the practice of the invention under all cleaning conditions.

The following examples are illustrative of the invention.

EXAMPLE 1

A mixture consisting of 4,320 grams of concentrated sulfuric acid, 852 grams of concentrated nitric acid, 6 grams of the quaternary methiodide of a perfluoro alkanesulfonamide, having an average perfluoro group of $C_8F_{17}$ per molecule, and 150 milliliters of 1,1,2-trifluorotrichloroethane was made up. A minor portion of the mixture was used to fill the trap of the type identified as 44 of an apparatus of the nature of that shown in FIGURE 1, as modified by FIGURE 2. The major portion of the mixture was placed in a heating chamber of a foaming unit identified as item 2 of the FIGURE 1 and heated to about 175° F.

A sample consisting of a badly corroded scale-covered metal piece, represented by item 60 of FIGURE 2 was placed in a treating chamber of the nature of item 50 of FIGURE 2.

Circulating water was passed through the shell of the treating vesel, similar to the shell indicated as item 54 of FIGURE 2 of the treating chamber to maintain a temperature therein between the limits of about 150° F. and about 190° F.

As heating proceeded, foam was generated, a portion passed therefrom into the treating chamber and from thence into the collapsing chamber where the temperature was maintained at about 60° F. At that temperature, the foam substantially collapsed, drained down into a trap of the nature of item 44 of FIGURE 2 and from there was returned to heating chamber 2. The foam produced was most satisfactorily stable, collapsed readily, and was refoamed.

After about 2 hours of continuous operation, during which the same composition was foamed, forced into contact with the scale-coated article, collapsed and returned for regeneration, the treatment was discontinued and the sample removed, washed and dried. It was completely free of corrosion, scale, or tarnish.

EXAMPLE 2

The procedure of Example 1 was repeated except that phytic acid having the formula of $C_6H_6O_6(H_2PO_3)_6$ was used as the solubilizing solution instead of the concentrated sulfuric-nitric acid solution of Example 1, and the foaming agent employed was the adduct of ethylene oxide and dinonylphenol (prepared by reacting them in a proportion of about 1 to 150, respectively). After 6 hours the sample which was badly corroded prior to treatment was rendered completely free of scale, corrosion, and tarnish, as in Example 1.

Other stabilizing agents selected from various surfactants may be employed with acceptable results.

The foam stabilizing agent employed in Example 1 performs in a manner so superior as to not be fully equivalent, to the other stabilizing agents employed. Accordingly, stabilizers of the nature of those described in U.S. Patent 2,759,019, and especially the quaternary methiodide of the perfluoroalkanesulfonamide wherein the perfluoroalkane groups per molecule average about 8 carbon atoms and 17 fluorine atoms is particularly recommended for use in the practice of the invention.

The invention offers a number of advantages including light-density treating composition, which provides a continuous process wherein the foamed treating composition can be repeatedly used, only as required occasionally discarding that which is laden with dislodged scale, it only being necessary to replenish the solubilizing material, foaming agent, and foam stabilizer discarded.

Having described our invention, what we claim and desire to protect by Letters Patent is:

1. The method of continuously cleaning a solid surface comprising: (1) heating a mixture consisting essentially of a liquid containing a foaming agent, which is admixed with said mixture as a liquid but which converts to a gas at the advanced temperature thus attained, and a foam stabilizing agent, which at the advanced temperature decreases the surface tension of the foam so formed, to a temperature sufficiently high to convert at least a part of the mixture to foam; passing at least a part of the foam so produced into contact with said surface ; (2) subjecting the foam after contact with said material to a temperature sufficiently low to collapse at least a substantial portion thereof to form a liquid due to at least a substantial portion of the foaming agent therein resuming the liquid state at the lower temperature; and (3) reheating a substantial portion of the thus reformed liquid thus produced from the collapsed foam containing liquified foaming agent to refoam it.

2. The method according to claim 1 wherein the refoamed liquid is recirculated into contact with the solid surface being treated, is repeatedly collapsed and again refoamed until adequate treatment of the surface is attained.

3. The method according to claim 1 wherein the solid surface being treated is a scale-coated metal article.

4. The method according to claim 3 wherein the solid surface being treated is the interior of a vessel.

5. The method according to claim 1 wherein the foam stabilizing agent is a quaternary methyl halide of a perfluoroalkanesulfonamide.

6. The method according to claim 5 wherein the methyl halide is methiodide and the average fluoroalkane group is $C_8F_{17}$.

7. The method according to claim 1 wherein said unfoamed liquid is passed into a trap whereby sludge contained therein is separated from the liquid prior to its being again heated.

8. The method of continuously cleaning a solid surface comprising: (1) heating a mixture consisting essentially of a liquid containing a foaming agent, selected from the class consisting of $CClF_2CClF_2$, $CHClF_2$, and mixtures thereof, and a foam stabilizing agent, which at the advanced temperature decreases the surface tension of the foam so formed, to a temperature sufficiently high to convert at least a part of the mixture to foam; passing at least a part of the foam so produced into contact with said surface; (2) subjecting the foam after contact with said material to a temperature sufficiently low to collapse at least a substantial portion thereof to form a liquid due to at least a substantial portion of the foaming agent therein resuming the liquid state at the lower temperature; and (3) reheating a substantial portion of the thus formed liquid thus produced from the collapsed foam containing the liquified foaming agent to reform it.

References Cited

UNITED STATES PATENTS

| 1,351,089 | 8/1920 | Wirth-Frey | 252—307 |
| 1,560,286 | 11/1925 | Mount | 252—361 XR |
| 2,563,151 | 8/1951 | Bjorksten | 252—361 XR |
| 2,759,019 | 8/1956 | Brown et al. | 260—556 |
| 3,037,887 | 6/1962 | Brenner et al. | 134—22 |
| 3,078,190 | 2/1963 | Blaser et al. | 134—10 |

FOREIGN PATENTS 75,203   1/1919   Austria.

MORRIS O. WOLK, *Primary Examiner.*

J. ZATARGA, *Assistant Examiner.*

U.S. Cl. X.R.

134—22, 36, 42, 109, 166; 252—361